Figure 1:
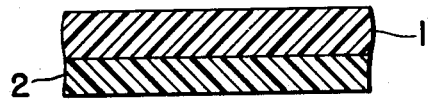

May 29, 1956  G. BORGESE  2,748,042

LAMINATED MATERIALS

Filed Nov. 23, 1954

LAYERS 1 AND 1ª OF HIGHLY PLASTICIZED POLYVINYL RESIN COMPOSITION CHARACTERIZED BY HIGH RESILIENCY AND GREAT RESISTANCE TO WEAR AND SCRATCHING.

LAYERS 2 AND 2ª OF RELATIVELY NON-DEFORMABLE MATERIAL, ADVANTAGEOUSLY POLYVINYL RESIN COMPOSITION POOR IN PLASTICIZER.

INVENTOR

GIUSTO BORGESE

BY *Stone, Boyden + Mack*

ATTORNEYS.

United States Patent Office 2,748,042
Patented May 29, 1956

2,748,042

LAMINATED MATERIALS

Giusto Borgese, Milan, Italy, assignor to Societa Del Linoleum, Societa Per Azioni, Milan, Italy Application November 23, 1954, Serial No. 470,728

7 Claims. (Cl. 154—49)

This invention relates to laminated material and particularly to improved laminates comprising an exposed working surface of polyvinyl resinous material and characterized by a markedly reduced tendency toward dimensional changes during use, such laminates being particularly useful for floor coverings and the like.

Vinyl resin compositions have found considerable success as floor covering material, such as sheets and tiles, and for like purposes, because of the resiliency, improved wear characteristics and attractive appearance offered by these materials. I have observed, however, that floor coverings and the like fabricated from such materials have a highly undesirable tendency toward dimensional change during use. It appears that this tendency results because of the shrinkage and relaxation characteristics of the vinyl resin compositions when the same contain relatively high proportions of plasticizer.

In the case of shrinkage, it appears that the relatively high proportion of plasticizer in the vinyl resin causes swelling, and thus an increased spacing of the molecules. During use, there is a tendency for the plasticizer to be lost, so that the swelling is gradually reduced and the product shrinks correspondingly. A similar result occurs because of thermoelasticity, the tendency for elastic recovery of a deformation, such recovery being confined by the limit of molecular creep, which is lowered as temperature increases.

Relaxation, on the other hand, results because of the thermoplastic nature of the highly plasticized vinyl resin. Thus, compressive forces applied to the product, as by the application of weight to a floor covering, tend to cause permanent deformations, usually elongation of the linear dimensions normal to the direction of the applied force.

Attempts have been made to reduce the dimensional changes resulting from shrinkage and relaxation by including in the vinyl composition increased amounts of fillers. This has not proved to be a satisfactory solution to the problem, however, because the increased amounts of fillers tend to greatly reduce the resiliency of the product and to seriously impair the resistance to wear and scratching.

The present invention provides improved laminates which overcome these heretofore inherent disadvantages in the use of highly plasticized vinyl resin compositions while allowing the use of an exposed wear or work surface of highly plasticized, and, therefore, highly resilient and wear-and-scratch-resistant, vinyl resin composition. In accordance with the invention, layers of highly plasticized vinyl resin are alternated with layers of a relatively non-deformable material, such as a resinous compound poor in plasticizer, the layers being uniformly bonded one to the other to form a laminate the overall characteristics of which are determined jointly by the highly plasticized layers and the relatively non-deformable layers. Thus, the product of the invention may take the form of a surface layer of a polyvinyl resin composition containing a relatively high proportion of plasticizer and relatively free from filler materials uniformly sealed to a backing layer of substantially pure polyvinyl resin poor in plasticizer, the surface layer being characterized by high resiliency and resistance to wear and scratching while the backing layer is substantially non-deformable under the conditions met with in floor coverings and the like.

The more resilient highly plasticized layer or layers of the laminate may be fabricated from any of the polyvinyl resins, such as polyvinyl chloride, or from any of the vinyl copolymers, such as the copolymers of vinyl chloride and vinyl acetate, for example. Advantageously, the relatively non-deformable layer or layers of the laminate may be fabricated from the same vinyl resin, though other synthetic resin compositions may be employed.

When all layers are of suitable resinous material, they may be bonded uniformly one to the other simply by subjecting the assembled layers to heat and pressure. Alternatively, I may employ a thin film of adhesive between the layers, such adhesive comprising a solution of the particular vinyl resin employed for the resilient layer in a solvent such as cyclohexanone, chlorobenzene or the like.

In accordance with particularly advantageous embodiments of the invention, the resilient layer or layers of the laminate are fabricated from a vinyl resin composition, including 20–30% by weight plasticizer, and either entirely or substantially free from fillers, while the relatively non-deformable layer or layers are fabricated from a synthetic resin composition, advantageously a polyvinyl, including less than 10% by weight of plasticizer.

The following examples are illustrative:

Example I

Composition A: Parts by weight
Polyvinyl chloride _____ 65
Plasticizing agent such as dioctilphthalate ____ 25
Stabilizing agent such as calcium stearate ____ 3
Colors and pigments _____ 7

Composition B:
Substantially pure polyvinyl chloride _____ 100

The two compositions are separately prepared in the usual manner, each being processed under heat on a cylinder rolling mill of the open type, the heated compositions then being calendered for milling into sheets. The sheets of Composition A may be 0.5–1 mm. in thickness, while sheets of Composition B are 0.5–0.6 mm. in thickness.

Sheet 1, Fig. 1, is of Composition A, while sheet 2 is of Composition B. One surface of sheet 2 is coated with a solution of polyvinyl chloride in cyclohexanone, the sheets 1 and 2 assembled as seen in Fig. 1 with the coated surface of sheet 2 engaging the sheet 1, and the assembly is sealed by pressing in a hydraulic press having heated pressing surfaces. The laminate is then subjected to a heat treatment at approximately 60° C. for about 24 hours to relieve any stresses resulting from the calendering operation. The completed laminate is then cut into tiles or sheets according to the requirements of the particular use involved.

Example II

Composition A: Parts by weight
Polyvinyl chloride _____ 65
Plasticizing agent such as dioctilphthalate ____ 25
Stabilizing agent such as calcium stearate ____ 3
Colors and pigments _____ 7

Composition B:
Polyvinyl chloride _____ 90
Plasticizing agent such as dioctilphthalate ____ 9
Stabilizing agent such as calcium stearate ____ 1

Figure 2:
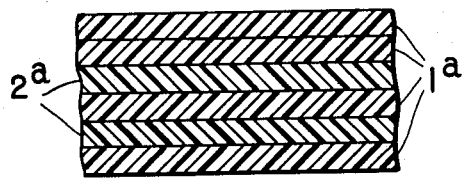

Four sheets of Composition A and two sheets of Composition B, each approximately .5–.6 mm. in thickness, are prepared in the manner described with reference to Example I. Both sheets of Composition B are then coated on both sides with a solution of polyvinyl chloride in cyclohexanone, and these sheets, as seen at $2^a$, Fig. 2, are then superposed alternately with two sheets $1^a$ of Composition A. The two remaining sheets $1^a$, with a coating of the same adhesive therebetween, are superposed upon the adhesive-coated exposed surface of the uppermost sheet $2^a$. The assembly is then hot pressed, either by a hydraulic press or a continuous assembling machine, and the resulting laminate heat treated at approximately 60° C. for about 24 hours to relieve any stresses resulting from the calendering operation. The finished laminate is then cut into tiles or sheets of the desired size.

In both examples, the product is a laminate having one exposed layer composed of resilient highly plasticized polyvinyl chloride, which is highly resistant to wear and scratching, such layer being sealed to a coextensive layer of polyvinyl chloride poor in plasticizer, such latter layer being highly resistant to deformation and imparting to the laminate a markedly reduced tendency toward dimensional changes resulting from shrinkage or relaxation. As has been pointed out with reference to Example I, the thickness of the non-deformable layers is kept within the range of 0.5–0.6 mm. It has been found that, if the non-deformable layers are substantially thicker than 0.6 mm., the resulting laminate is unduly stiff. The thickness of the resilient layer may range up to 1 mm., so that a 2-ply laminate made in accordance with the invention may be as thick as about 1.6 mm. Where greater thickness is desired, more than one layer of non-deformable material is employed, in the manner exemplified by Example 2.

It will be understood that the specific nature of the plasticizer employed is not a critical feature of the invention. Thus, in place of dioctilphthalete, any suitable plasticizer might be employed, such, for example, as tricresylphosphate or the alkyd polyesters. Similarly, any suitable stabilizing agent, such as the basic lead silicates and sulfates, the cadmium stearates, etc., may be employed in place of the calcium stearate mentioned in the examples. It will be noted in Example II that the non-deformable layer, fabricated from Composition B, consists essentially of resin and plasticizer, only 1% of stabilizing agent being used in addition thereto, with the ration of plasticizer to polyvinyl resin being 1:10.

I claim:

1. An improved floor covering characterized by a markedly reduced tendency toward dimensional changes resulting from shrinkage and relaxation, comprising a surface layer of a highly plasticized polyvinyl chloride resinous composition substantially free from fillers uniformly bonded to a backing layer of substantially pure polyvinyl chloride, said surface layer being 0.5–1 mm. in thickness and said backing layer being 0.5–0.6 mm. in thickness.

2. An improved laminate useful for floor coverings characterized by a markedly reduced tendency toward dimentional changes resulting from shrinkage and relaxation, comprising a facing layer of a polyvinyl resinous material substantially free from fillers and containing 20–30% by weight plasticizer, said facing layer being 0.5–1 mm. in thickness and characterized by relatively high resiliency and resistance to wear and scratching, and a second layer characterized by relatively low resiliency bonded to said facing layer and substantially coextensive therewith, said second layer being 0.5–0.6 mm. in thickness and being composed of at least about 90% by weight polyvinyl resin and not more than 1 part by weight plasticizer per each 10 parts by weight resin.

3. A product as defined in claim 2 and wherein said second layer is substantially completely free of plasticizer.

4. An improved laminate useful for floor coverings and characterized by a markedly reduced tendency toward dimensional changes resulting from shrinkage and relaxation, comprising alternate layers of (1) a polyvinyl resinous material substantially free from fillers and containing 20–30% by weight plasticizer, and (2) a polyvinyl resinous composition containing at least about 90% by weight resin and not more than 1 part by weight plasticizer per each 10 parts by weight resin, said layers being substantially coextensive and uniformly bonded each to the other, a layer of said first-mentioned composition constituting the exposed working surface of the laminate, said first-mentioned layers being 0.5–1 mm. in thickness and characterized by relatively high resiliency and resistance to wear and scratching, and said layers of said second-mentioned composition being 0.5–0.6 mm. in thickness and characterized by relatively low resiliency.

5. A product as defined in claim 2 and wherein the layers of said second-mentioned composition are substantially completely free of plasticizers.

6. An improved laminated floor covering characterized by a markedly reduced tendency toward dimentional changes resulting from shrinkage and relaxation, comprising a facing layer of highly plasticized polyvinyl resinous material substantially free from fillers and a second layer of a polyvinyl resinous composition consisting essentially of polyvinyl resin, plasticizer and stabilizer, said composition containing less than 10% plasticizer and the plasticizer being present in a weight ratio of not more than one part plasticizer per 10 parts polyvinyl resin, said facing layer being 0.5–1 mm. in thickness and said second layer being 0.5–0.6 mm. in thickness, and said layers being substantially coextensive and uniformly bonded one to the other.

7. A product as defined in claim 6 and wherein the polyvinyl resin of said layers is polyvinyl chloride.

References Cited in the file of this patent

UNITED STATES PATENTS

| | | |
|---|---|---|
| 1,777,309 | Hopkinson | Oct. 7, 1930 |
| 2,196,577 | Currie | Apr. 9, 1940 |
| 2,434,541 | Bierer | Jan. 13, 1948 |
| 2,453,052 | Van Etten | Nov. 2, 1948 |
| 2,553,124 | Williams | May 15, 1951 |
| 2,617,750 | LeClair et al. | Nov. 11, 1952 |
| 2,690,590 | Goulding et al. | Oct. 5, 1954 |